Oct. 16, 1962  C. I. ANDERSON  3,058,284
LAWN DEBRIS CHOPPER
Filed April 15, 1959  2 Sheets-Sheet 1

INVENTOR.
CHARLES I. ANDERSON
BY
HORTON, DAVIS, BREWER & BRUGMAN

Oct. 16, 1962 C. I. ANDERSON 3,058,284
LAWN DEBRIS CHOPPER
Filed April 15, 1959 2 Sheets-Sheet 2
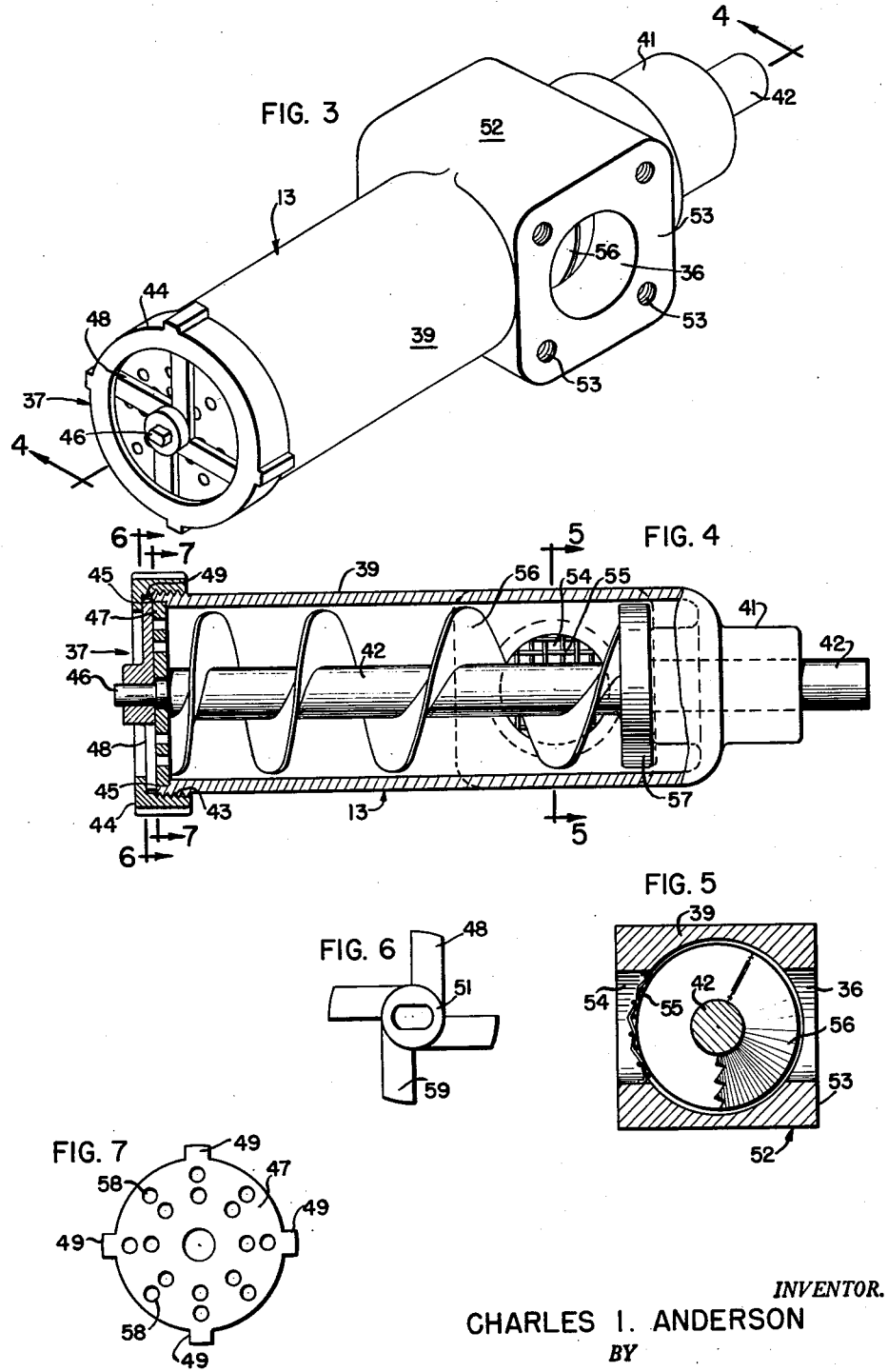
INVENTOR.
CHARLES I. ANDERSON
BY
HORTON, DAVIS, BREWER & BRUGMAN

United States Patent Office 3,058,284
Patented Oct. 16, 1962

3,058,284
LAWN DEBRIS CHOPPER
Charles I. Anderson, 3837 Woodside Ave., Brookfield, Ill.
Filed Apr. 15, 1959, Ser. No. 806,506
3 Claims. (Cl. 56—25.4)

This invention relates to a combination of a lawn mower functioning cooperatively with a means for changing grass clippings and other debris into a form beneficial to the lawn and redistributing the same onto the lawn in that form.

Vegetable debris, such as grass clippings, leaves, twigs, etc., is not only unsightly, but accumulations of these materials adversely affect the health of a lawn. In order to maintain a healthy and beautiful lawn, it is necessary to remove these materials by raking or sweeping. The vegetable debris removed by raking represents a loss of organic material, which, if in the proper form, provides nutrition and mulch to the lawn both of which are desirable in lawn care.

An object of my invention is to provide a means for removing unsightly and unhealthy vegetable debris from a lawn and to redistribute the same onto the lawn in an altered form that is beneficial to the lawn.

It is another object of my invention to provide the combination of a lawn mower and a means for removing unsightly vegetable debris and changing it to a form that is beneficial to a lawn and redistributing the same onto the lawn.

It is another object of this invention to provide, in combination with a rotary mower, a conduit connecting the clippings discharge vent to a chopper.

It is another object of this invention to include a centrifugal blower in combination with a conduit and a chopper to induce a flow of air from a source of vegetable debris to the chopper.

It is another embodiment of this invention to employ in combination, a worm-fed chopper having an inlet for debris and a perforated outlet for air with the worm or screw from said chopper in wiping relationship with said perforated outlet.

It is another object of this invention to include means for distributing chopped debris onto the lawn.

These and other objects are accomplished by the device of this invention which includes a worm-fed chopper or grinder having a slide inlet for air-borne debris and a perforated or screened outlet for air which filters substantially all of the debris from a flowing air stream passing through the chopper. The worm in the chopper is in sliding contact with the screen or perforated air outlet so that it continuously wipes accumulated debris from the outlet thereby transporting the debris to the cutters of the device and maintaining the filter free of accumulated debris to preserve a flow of air therethrough. The combination of this invention also includes a centrifugal blower or equivalent device which is employed in combination with the chopper and a conduit connecting the chopper to a source of debris to induce a flow of air from the source to the inlet of the chopper. The combination includes a lawn mower, preferably of the rotary type, having the discharge vent for grass clippings from the lawn mower positioned to discharge the clippings into a conduit in which they are entrained in an air stream and carried to a chopper.

Other advantages of this invention will become apparent from the following description of a presently preferred embodiment of it made in conjunction with the accompanying drawings.

In the accompanying drawings:

FIG. 3 is an enlarged isometric view of a chopper or grinder suitable for use in this invention;

FIG. 4 is a sectional view of said chopper taken along the line 4—4;

FIG. 5 is a sectional view of said chopper taken along the line 5—5;

FIG. 6 is a sectional view of said chopper taken along the line 6—6;

FIG. 7 is a sectional view of a chopper taken along the line 7—7.

Figure 1:
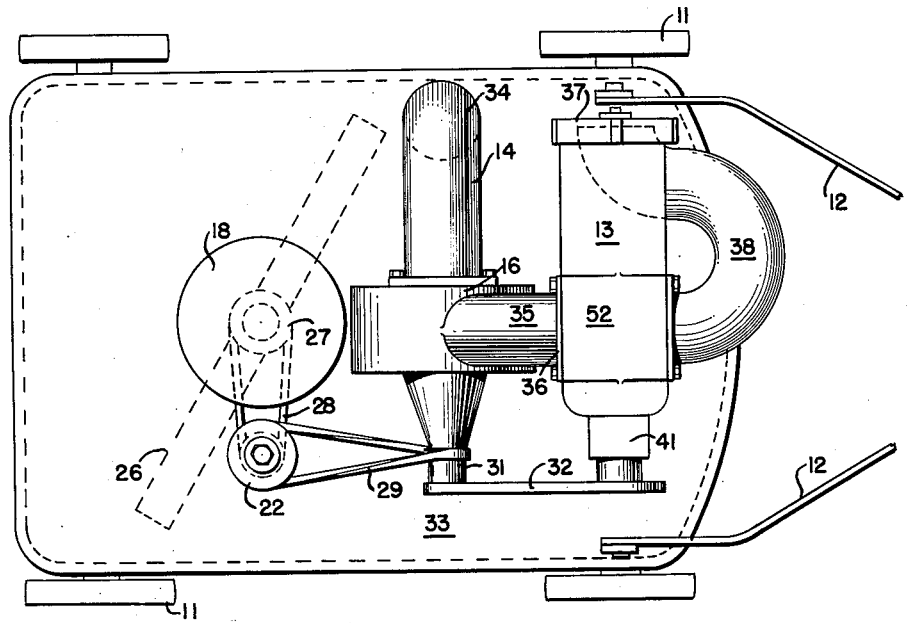
FIG. 1 is a plan view of a lawn care device embodying this invention.

The frame or housing 33 is provided with a mower blade 26 rotating in a horizontal plane beneath it, in addition to a centrifugal blower 16 and a chopper 13. The prime mover 18 is connected to drive the mower blade 26 directly, and a pulley 27 operates through a V-belt 28 to actuate an idler assembly 22. The idler assembly 22 supplies power to a V-belt 29 operating through a double pulley 31 which supplies eenergy to centrifugal blower 16 and to another V-belt 32 which connects with a pulley 24 which in turn supplies power to the grinder 13.

The blade rotates within the housing 33 which, in this embodiment, also acts as a frame for holding the various elements of the combination. The intake conduit 14 of the centrifugal blower 16 is connected to a port 34 in the housing 33. The operation of centrifugal blower 16 causes a rapid current of air to flow from beneath the housing 33 entraining the grass clippings which result from the operation of blade 26. The grass clippings, as well as other debris which was on the lawn is propelled in the air stream produced by blower 16 through the conduit 35 into the inlet port 36 of the chopper 13. The chopper 13 removes entrained debris from the air stream, converts it to a finely chopped stream and discharges it from the discharge end 37. An air stream which is substantially free of entrainment passes from chopper 13 through conduit 38 which may be positioned to blow beneath chopper 13 and directed to scatter the chopped particles of organic matter that discharge from it.

Figure 2:
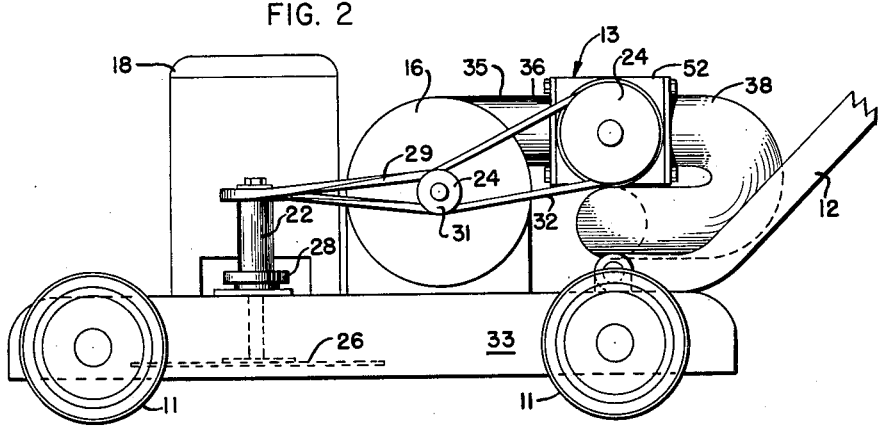
FIG. 2 is an elevation view of the device pictured in FIG. 1.

In the foregoing description of FIGURES 1 and 2, it may be noted that the centrifugal blower 16 may be disposed either upstream or downstream of the chopper 13, however, to avoid any damage to the blower 16 it is preferred that it be disposed downstream of the chopper so that substantially all of the entrainment is removed from the air stream prior to its entry into the blower 16.

As best illustrated in FIGS. 3 and 4, the chopper or grinder of this invention is a modified grinder of the worm-fed type. The grinder 13 comprises a cylindrical housing 39 that is radially contracted at one end thereof to form a bearing housing 41 which is restricted to snugly hold the end of a worm operating shaft 42. The other end of the cylindrical housing 39 is provided with threads 43 which adapt the housing to receive a retaining cap 44. The cylindrical housing, at the threaded end thereof, is adapted with notches 45 which cooperates with a stationary cutter in a manner to be hereinafter described. Worm operating shaft 42 terminates at the discharge portion of chopper 13 in a portion having flat surfaces formed in it, or in a squared end which cooperates with a moving cutter in a manner to be hereinafter described.

In the discharge end of chopper 13 a pair of cutters are maintained. The cutters comprise a stationary cutter 47 and a rotating cutter 48. As indicated in FIGS. 6 and 7, the stationary cutter 47 is adapted with projections 49 which engage notches 45 thereby preventing rotation of stationary cutter 47 relative to cylindrical housing 39. Rotating cutter 48 is provided with a noncircular central hole 51 which is adapted to engage the flat surfaces at the end 46 of the shaft 42.

The inlet port 36 to the chopper comprises an opening in the side wall of the chopper which is adapted to receive the inlet conduit 14 or 35, see FIGURE 1, in sealed relationship. As best illustrated in FIG. 3, square housing 52 is milled or otherwise machined to have a flat surface 53 which, when suitably gasketed, will provide a seal with a cooperating element on an inlet conduit. Connection may be effected by means such as bolts or studs in threaded holes 53 which are provided to receive them.

The outlet port 54 comprises an opening in the side wall of the housing which is adapted to filter the air stream discharging therefrom. The filter is shown herein as a screen 55 shaped as a cylindrical segment and conforming to the interior contours of cylindrical housing 39. The filter may comprise drilled perforations, slots or other types of openings which are suitable to permit the flow of air therethrough but which are too small to permit the lawn debris to pass.

In operation, shaft 42 is rotated at a suitable speed by the prime mover and in the direction that causes the worm 56 to carry solid material toward the cutters or discharge end of the chopper. The worm extends from a point beyond outlet port 54 and preferably terminates in a collar 57 which prevents organic material from becoming lodged around bearing housing 41. The cooperative effect of the rotating worm and the cylindrical screen is to have the worm continuously wiping debris from the screen so that a continuous and steady flow of air may pass through the screen and a continuous and steady flow of debris may be transported toward the cutters. The action of the worm forces debris through the perforations 58 in stationary chopper 47 as an extruded stream of organic material having its fibrous structure broken to some extent. As the debris is extruded through the perforations 58, the rotating blades 59 shear the extruded material into extremely finely divided particles.

The device of this invention may be modified in many ways within the broad scope of the invention. There are numerous acceptable and equivalent blowers that may be employed to induce a flow of air from the source of debris to the chopper and it is intended that those known blowers are included within the invention. Similarly there are many worm operated choppers which are equivalent and those known choppers are also intended as being within the scope of this invention. Other modifications of the housing, the handle and the prime mover may be made without departing from the spirit of this invention.

From the foregoing description it is clear that the lawn care device of this invention provides a simple, compact and efficient means of cutting and removing vegetable debris from a lawn without introducing a problem of disposal and without losing valuable material useful in producing a beautiful and healthy lawn.

Having thus described my invention, what I claim as new and desire to secure by Letters Patent of the United States is:

1. A lawn care device comprising a mobile frame, a source of power on said frame, a forage cutter operatively associated with said frame and connected to said source of power, a chopper having a worm feeder connected thereto on said frame, and power operated pneumatic conveying means extending from a point adjacent said cutter to said feeder for delivering loose forage from adjacent said cutter to said feeder.

2. The structure as defined in claim 1 in which the pneumatic conveying means has an intake disposed beneath the frame and adjacent the cutter.

3. The lawn care device of claim 1 further characterized in that said worm-fed chopper is provided with an air inlet and an air outlet and said air outlet comprises a perforated opening shaped as a cylindrical segment and in sliding contact with said worm.

References Cited in the file of this patent

UNITED STATES PATENTS

| | | |
|---|---|---|
| 962,780 | Nelson | June 28, 1910 |
| 1,324,490 | Bauer | Dec. 9, 1919 |
| 1,347,733 | Davis | June 27, 1920 |
| 1,917,782 | Vachon | July 11, 1933 |
| 2,436,011 | Lucas | Feb. 17, 1948 |
| 2,491,544 | Arkenberg | Dec. 20, 1949 |
| 2,494,062 | Sherrow | Jan. 10, 1950 |
| 2,538,643 | Gregory | Jan. 16, 1951 |
| 2,661,584 | Ronning | Dec. 8, 1953 |
| 2,725,702 | Ross | Dec. 6, 1955 |
| 2,754,750 | Borrow | July 17, 1956 |
| 2,811,004 | Borrow | Oct. 29, 1957 |
| 2,840,972 | Schwarz | July 1, 1958 |